United States Patent
Tobin et al.

(10) Patent No.: US 10,161,381 B2
(45) Date of Patent: Dec. 25, 2018

(54) ROTOR BLADES HAVING THERMOPLASTIC COMPONENTS AND METHODS FOR JOINING ROTOR BLADE COMPONENTS

(71) Applicant: General Electric Company, Schenectady, NY (US)

(72) Inventors: James Robert Tobin, Simpsonville, SC (US); Christopher Daniel Caruso, Greenville, SC (US); Aaron A. Yarbrough, Greenville, SC (US); Daniel Alan Hynum, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 494 days.

(21) Appl. No.: 14/852,899

(22) Filed: Sep. 14, 2015

(65) Prior Publication Data
US 2017/0074238 A1 Mar. 16, 2017

(51) Int. Cl.
*F03D 1/06* (2006.01)

(52) U.S. Cl.
CPC ...... *F03D 1/0675* (2013.01); *F05B 2230/234* (2013.01); *F05B 2230/60* (2013.01); *Y02E 10/721* (2013.01); *Y02P 70/523* (2015.11)

(58) Field of Classification Search
CPC .... F03D 1/0675; F03D 13/10; F05B 2230/60; F05B 2230/234
See application file for complete search history.

(56) References Cited

U.S. PATENT DOCUMENTS 6,264,877 B1  7/2001 Pallu De La Barriere
8,317,479 B2  11/2012 Vronsky et al.
(Continued)

FOREIGN PATENT DOCUMENTS

CN  101906251  8/2010
JP  2007-92716  4/2007
(Continued)

OTHER PUBLICATIONS

Heston, Tim, "Clamp, enclose, laser-weld", Jun. 23, 2015, The Fabricator, https://www.thefabricator.com/article/laserwelding/clamp-enclose-laser-weld.*

(Continued)

*Primary Examiner* — Dwayne J White
*Assistant Examiner* — Danielle M Christensen
(74) *Attorney, Agent, or Firm* — Dority & Manning, PA

(57) ABSTRACT

Rotor blades and methods for joining blade components of rotor blades are provided. A method includes positioning an insert between and in contact with a first blade component and a second blade component. At least one of the first blade component or the second blade component includes a thermoplastic resin. The insert includes a thermoplastic resin and an energy absorptive pigment. The method further includes heating the thermoplastic resin of the at least one of the first blade component or the second blade component and the thermoplastic resin of the insert. The method further includes cooling the thermoplastic resin of the at least one of the first blade component or the second blade component and the thermoplastic resin of the insert. The heating step and the cooling step join the first blade component, the second blade component and the insert together.

18 Claims, 8 Drawing Sheets

(56) References Cited

U.S. PATENT DOCUMENTS

| | | |
|---|---|---|
| 8,657,581 B2 | 2/2014 | Pilpel et al. |
| 8,673,106 B1 | 3/2014 | Jolley et al. |
| 8,747,098 B1 | 6/2014 | Johnson et al. |
| 8,961,142 B2 | 2/2015 | Wansink |
| 8,992,813 B2 | 3/2015 | Robbins et al. |
| 2006/0027314 A1* | 2/2006 | Jones ............ B29C 33/10 156/245 |
| 2006/0283544 A1* | 12/2006 | Mori ............ B29C 65/1635 156/272.8 |
| 2009/0148300 A1* | 6/2009 | Driver ............ B29C 65/3412 416/223 R |
| 2010/0062238 A1* | 3/2010 | Doyle ............ B29C 70/02 428/295.1 |
| 2010/0143146 A1* | 6/2010 | Bell ............ F03D 1/06 416/233 |
| 2011/0097211 A1 | 4/2011 | Rudling |
| 2011/0198013 A1* | 8/2011 | Christiansen ........ B29C 33/02 156/64 |
| 2012/0195764 A1* | 8/2012 | Fuglsang ............ F03D 1/0641 416/223 R |
| 2013/0164133 A1 | 6/2013 | Grove-Nielsen |
| 2014/0295187 A1 | 10/2014 | Jacobsen et al. |

FOREIGN PATENT DOCUMENTS

| | | |
|---|---|---|
| WO | WO 2010/025830 A2 | 3/2010 |
| WO | WO 2011/088835 A2 | 7/2011 |
| WO | Wo 2011/098785 A2 | 8/2011 |
| WO | WO 2015/015202 A1 | 2/2015 |

OTHER PUBLICATIONS

Teuwen, et al.; "Vacuum Infused Thermoplastic Composites for Wind Turbine Blades," 2008 Wind Turbine Blade Workshop, Sandia National Laboratories—Presentation—May 12-14, 2008; (22 pages).

* cited by examiner

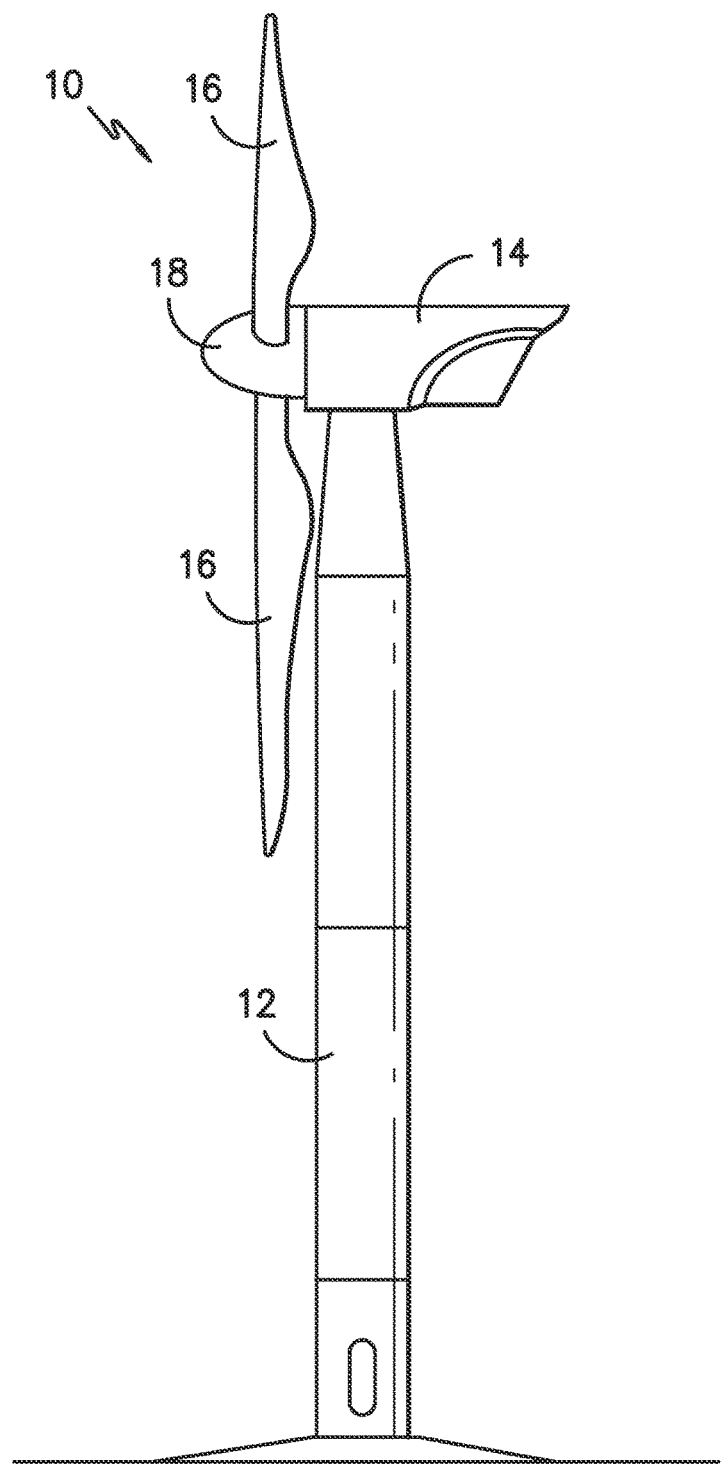
FIG. -1-

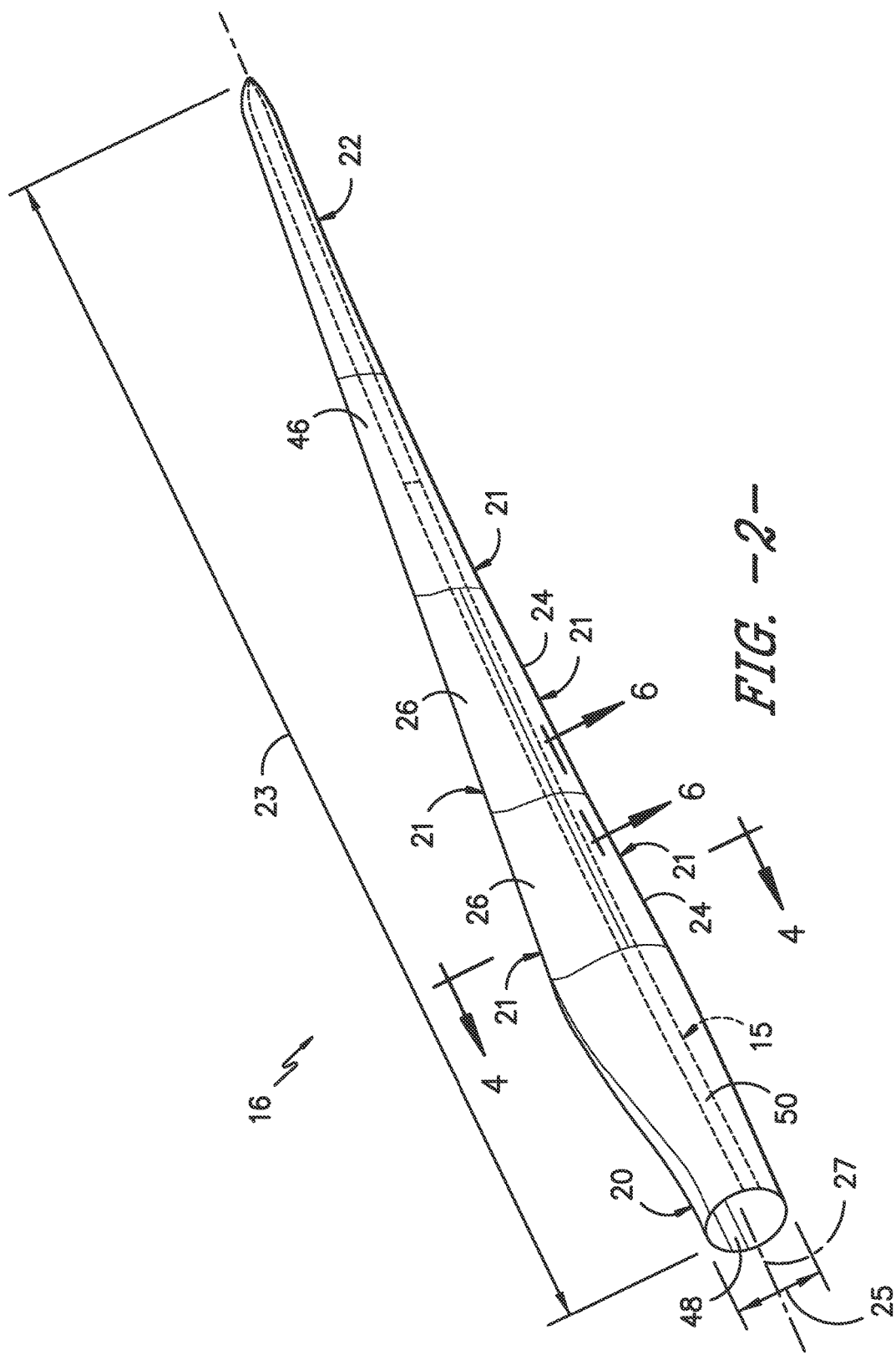

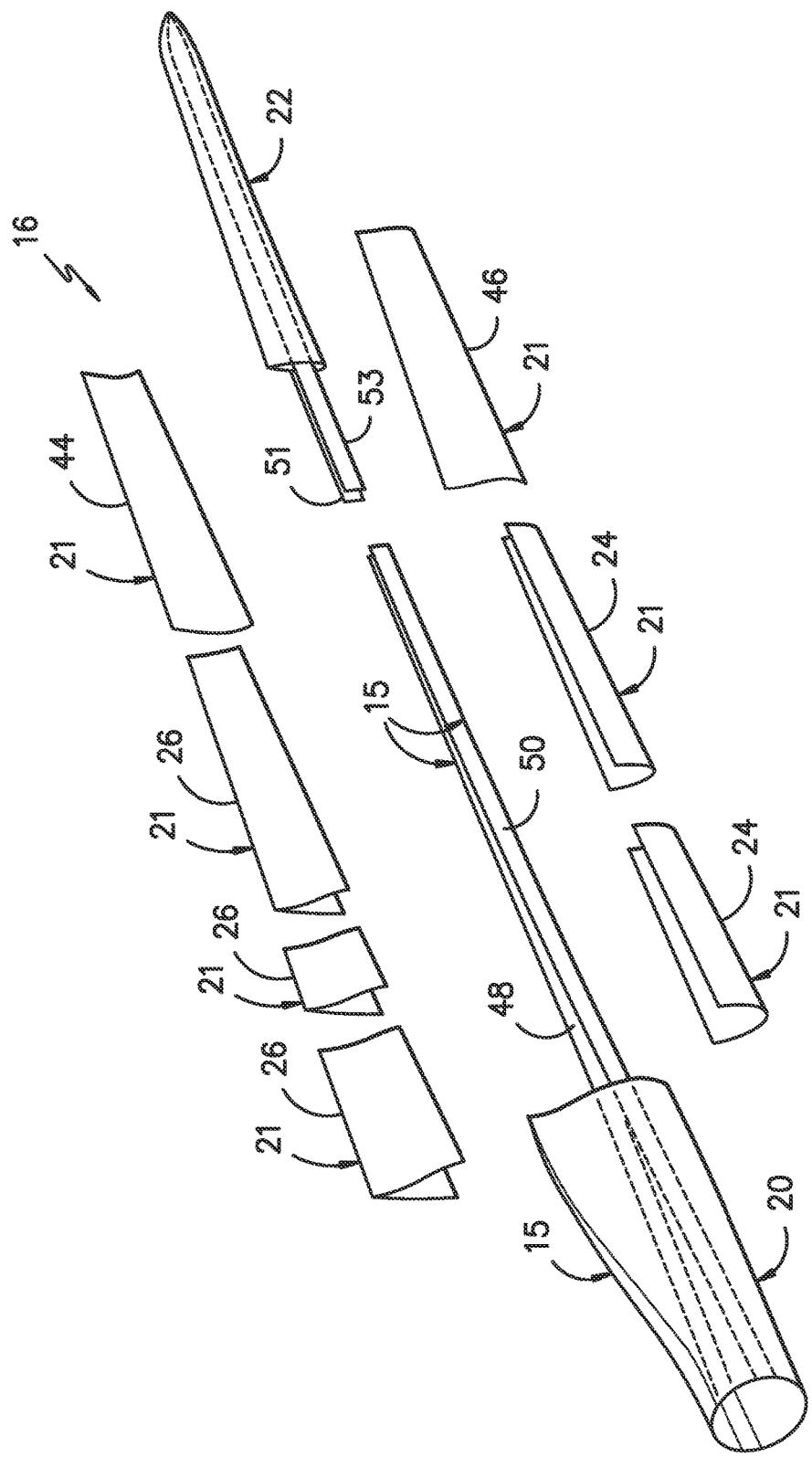
FIG. -3-

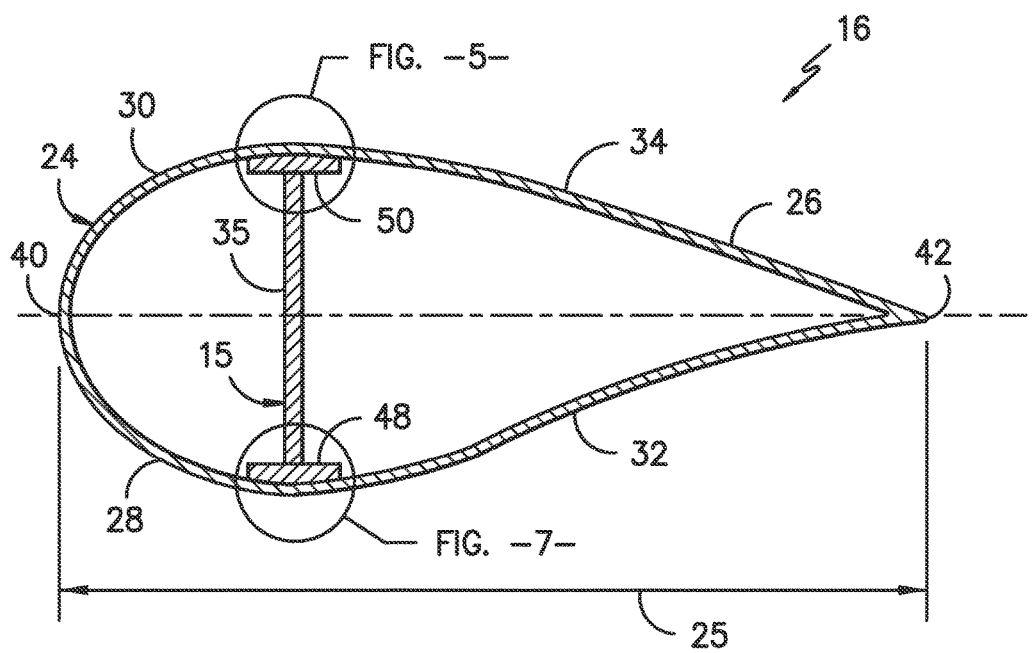
FIG. -4-
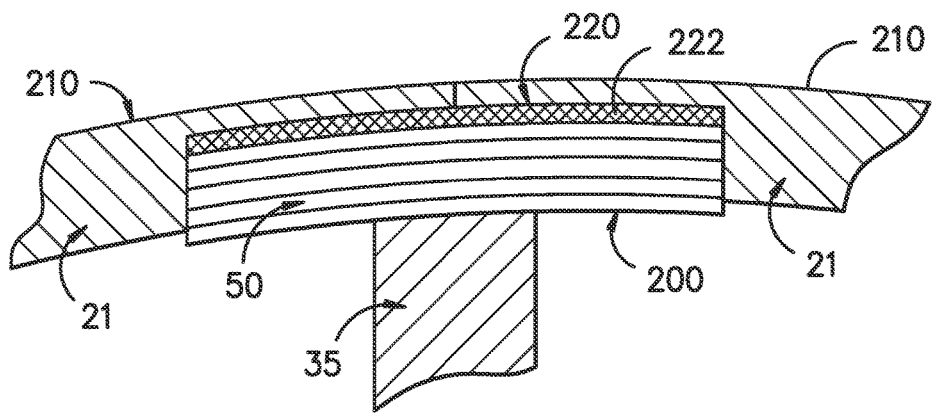
FIG. -5-

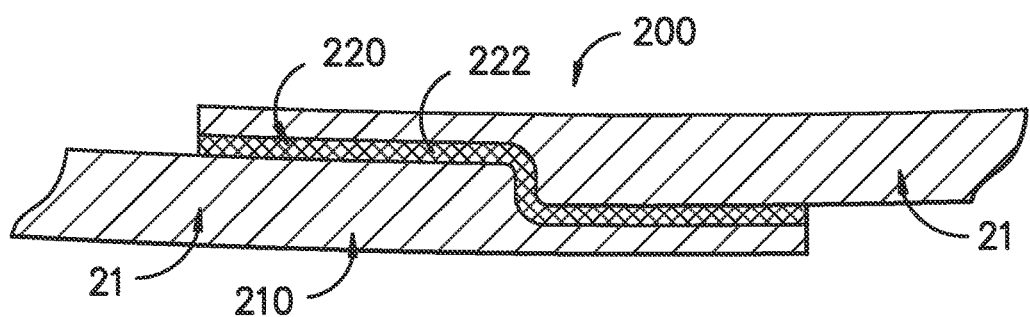
FIG. -6-
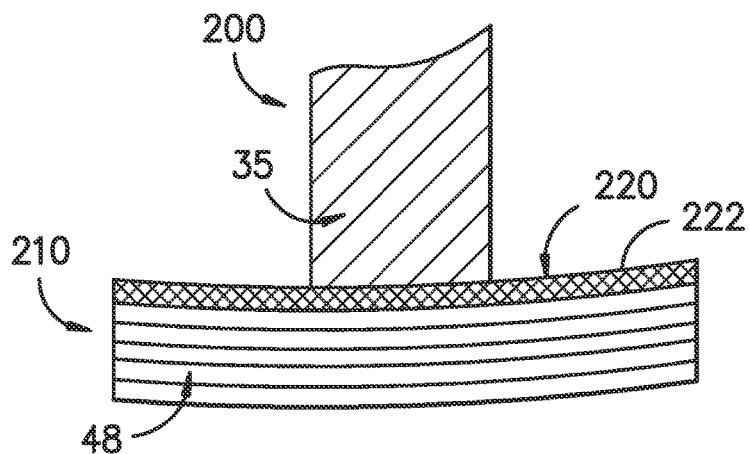
FIG. -7-

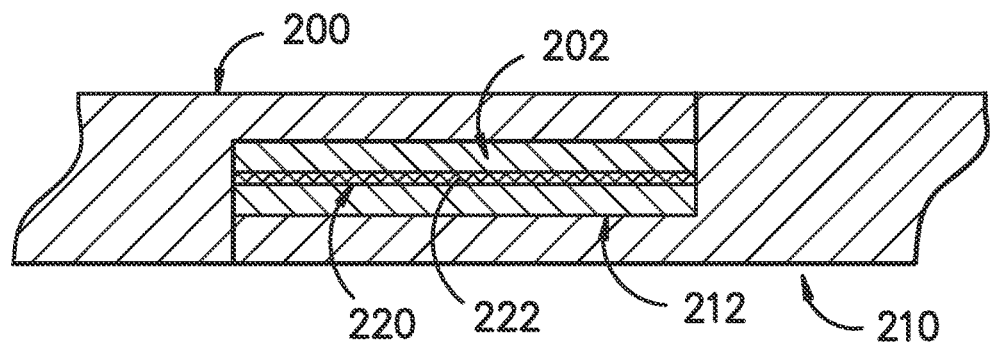
FIG. -8-
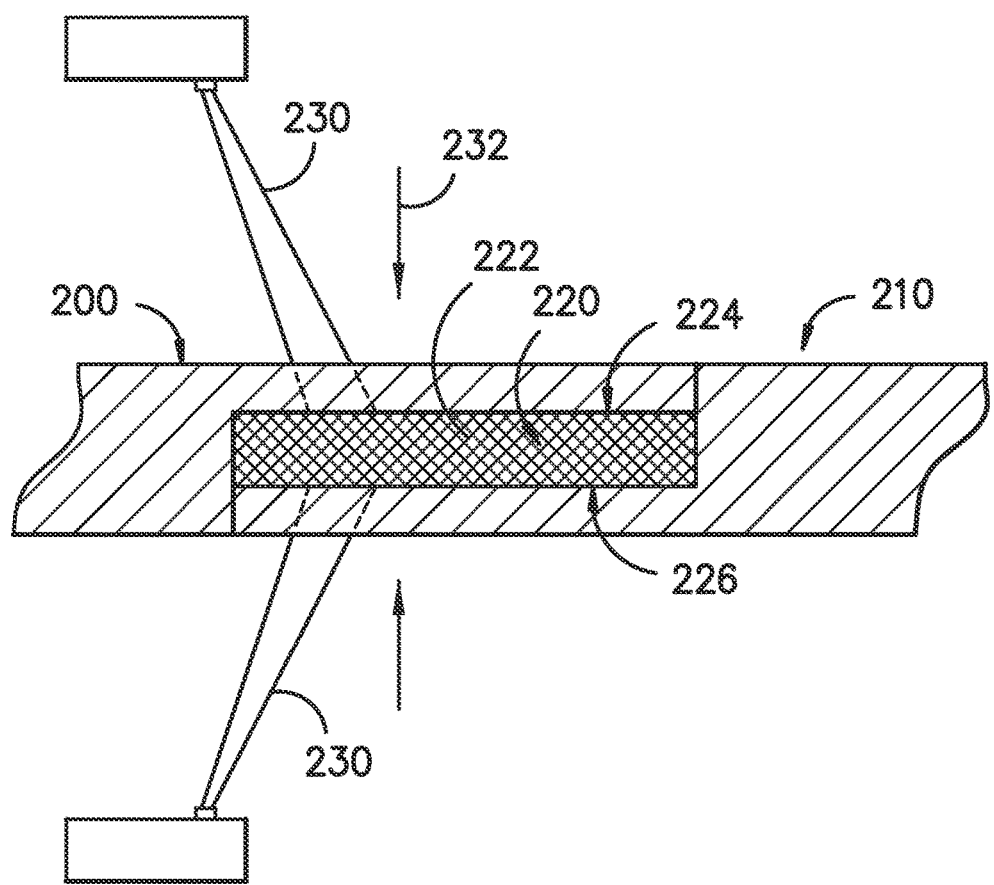
FIG. -9-

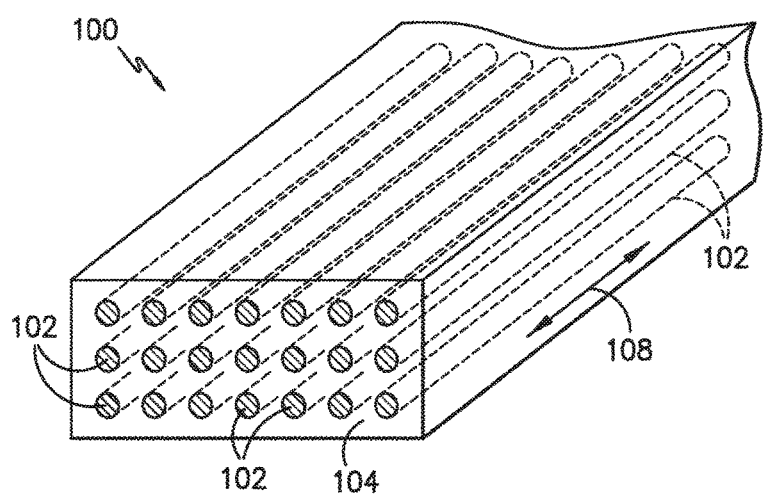
FIG. -10-

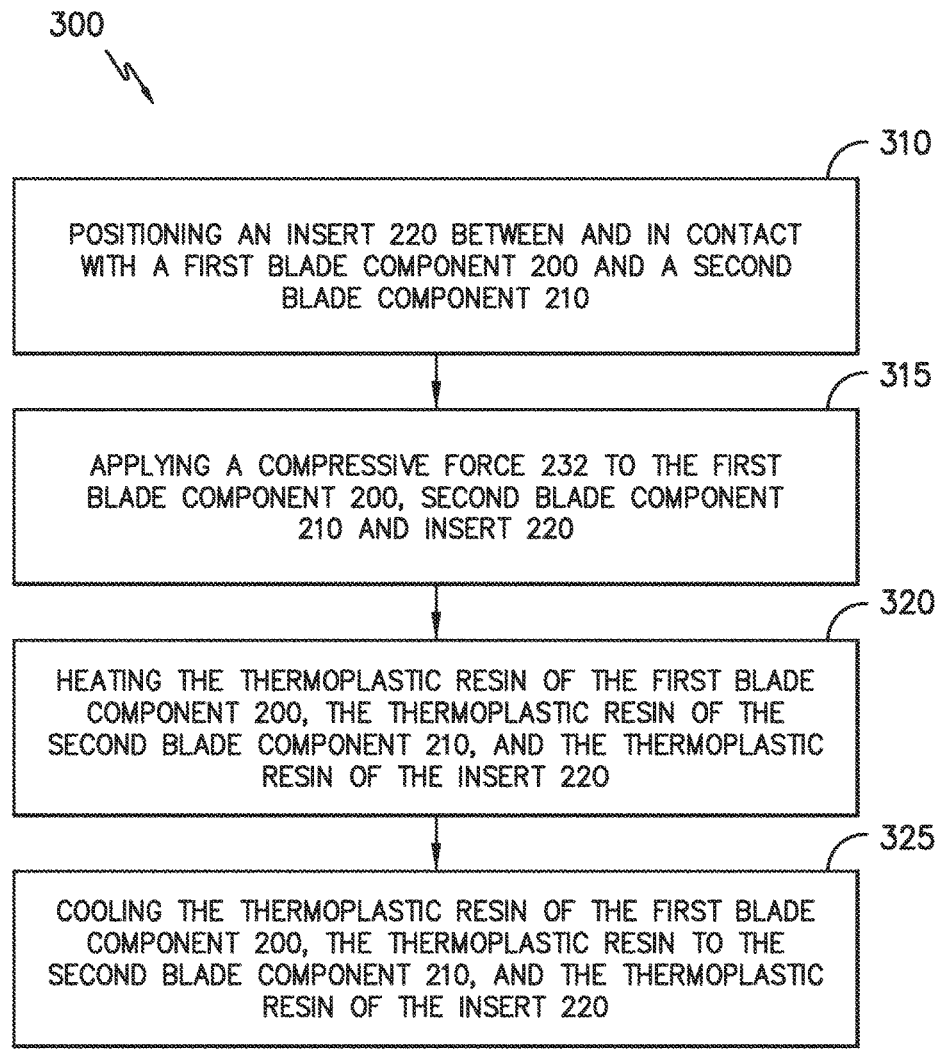
FIG. -11-

ROTOR BLADES HAVING THERMOPLASTIC COMPONENTS AND METHODS FOR JOINING ROTOR BLADE COMPONENTS

FIELD OF THE INVENTION

The present disclosure relates generally to wind turbine rotor blades, and more particularly to methods for joining blade components which include thermoplastics.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin.

Such rotor blades, however, are not without issues. For example, the bond lines of typical rotor blades are generally formed by applying a suitable bonding paste or compound along the bond line with a minimum designed bond width between the shell members. These bonding lines are a critical design constraint of the blades as a significant number of turbine blade field failures occur at the bond-line. Separation of the bond line along the leading and/or trailing edges of an operational turbine blade can result in a catastrophic failure and damage to the wind turbine.

Accordingly, improved methods for joining blade components of rotor blades, as well as associated rotor blades having improved joints, would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a method for joining blade components of a wind turbine rotor blade is provided. The method includes positioning an insert between and in contact with a first blade component and a second blade component. At least one of the first blade component or the second blade component includes a thermoplastic resin. The insert includes a thermoplastic resin and an energy absorptive pigment. The method further includes heating the thermoplastic resin of the at least one of the first blade component or the second blade component and the thermoplastic resin of the insert. The method further includes cooling the thermoplastic resin of the at least one of the first blade component or the second blade component and the thermoplastic resin of the insert. The heating step and the cooling step join the first blade component, the second blade component and the insert together.

In accordance with another embodiment, a rotor blade for a wind turbine is provided. The rotor blade includes a first blade component and a second blade component, at least one of the first blade component or the second blade component comprising a thermoplastic resin, and an insert between and in contact with the first blade component and the second blade component, the insert comprising a thermoplastic resin and an energy absorptive pigment. The first blade component, the second blade component and the insert are joined together by a welded interface between the insert and the first blade component and a welded interface between the insert and the second blade component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine in accordance with one embodiment of the present disclosure;

FIG. 2 is a perspective view of a rotor blade in accordance with one embodiment of the present disclosure;

FIG. 3 is an exploded view of the rotor blade of FIG. 2;

FIG. 4 is a cross-sectional view, along the line 4-4 of FIG. 2, of a rotor blade in accordance with one embodiment of the present disclosure;

FIG. 5 is a close-up view of a portion of the rotor blade of FIG. 4;

FIG. 6 is a cross-sectional view, along the line 6-6 of FIG. 2, of a rotor blade in accordance with one embodiment of the present disclosure;

FIG. 7 is a close-up view of a portion of the rotor blade of FIG. 4;

FIG. 8 is a schematic view of a portion of a rotor blade in accordance with one embodiment of the present disclosure;

FIG. 9 is a schematic view of a portion of a rotor blade being joined in accordance with one embodiment of the present disclosure;

FIG. 10 is a perspective view of a portion of a composite utilized in various components of a rotor blade in accordance with one embodiment of the present disclosure; and FIG. 11 is a flow chart illustrating a method in accordance with one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Referring now to FIGS. 2 and 3, various views of a rotor blade 16 according to the present disclosure are illustrated. As is generally understood, a rotor blade 16 according to the present disclosure may include exterior surfaces defining a pressure side, a suction side, a leading edge, and a trailing edge. The pressure side and suction side may each extend between the leading edge and the trailing edge. The exterior surfaces may extend between a blade tip and a blade root in a generally span-wise direction, as discussed below.

The pressure side, suction side, leading edge and trailing edge may be generally aerodynamic surfaces having generally aerodynamic contours, as is generally known in the art. Thus, the exterior surfaces of the rotor blade 16 may define an aerodynamic profile, such as an airfoil-like cross-sectional profile, for the rotor blade 16. The aerodynamic profile includes the pressure side, suction side, leading edge and trailing edge.

The rotor blade 16 may, in some embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define a chord and a span extending in chord-wise and span-wise directions, respectively. The chord may vary throughout the span of the rotor blade 16. Thus, as discussed below, a local chord may be defined for the rotor blade 16 at any point on the rotor blade 16 along the span.

Additionally, as shown in FIGS. 2 through 3, the rotor blade 16 may define an inboard portion and an outboard portion. The inboard portion may be a span-wise portion of the rotor blade 16 extending from the root. For example, the inboard portion may, in some embodiments, include approximately 33%, 40%, 50%, 60%, 67%, or any percentage or range of percentages therebetween, or any other suitable percentage or range of percentages, of the span from the root. The outboard portion may be a span-wise portion of the rotor blade 16 extending from the tip, and may in some embodiments include the remaining portion of the rotor blade 16 between the inboard portion and the tip. Additionally or alternatively, the outboard portion may, in some embodiments, include approximately 33%, 40%, 50%, 60%, 67%, or any percentage or range of percentages therebetween, or any other suitable percentage or range of percentages, of the span from the tip.

As shown, a rotor blade 16 in accordance with the present disclosure includes a main blade structure 15 constructed, at least in part, from a thermoset or a thermoplastic resin and at least one outer blade segment 21 configured with the main blade structure 15. More specifically, as shown, the rotor blade 16 includes a plurality of outer blade segments 21. The blade segment(s) 21 may also be constructed, at least in part, from a thermoset or a thermoplastic resin. The thermoplastic and/or the thermoset resin as described herein may optionally be reinforced with a fiber material, including but not limited to glass fibers, carbon fibers, metal fibers, or similar or combinations thereof, embedded in the resin to form a composite. Continuous or discontinuous fibers may be utilized. In exemplary embodiments, continuous fibers are utilized. The direction of the fibers may include biaxial, unidirectional, triaxial, or any other another suitable direction and/or combinations thereof. Further, the fiber content within a composite may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 4 and 7), and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. The rotor blade 16 also defines a chord 25 that is equal to the total length between a leading edge 40 of the rotor blade 16 and a trailing edge 42 of the rotor blade 16. As is generally understood, the chord 25 may generally vary in length with respect to the span 23 as the rotor blade 16 extends from the blade root section 20 to the blade tip section 22.

In some embodiments, as shown in FIGS. 2-3, the main blade structure 15 may include the blade root section 20 with one or more longitudinally extending spar caps 48, 50 infused therewith. For example, the blade root section 20 52 may be configured according to U.S. application Ser. No. 14/753,155 filed Jun. 29, 2015 entitled "Blade Root Section for a Modular Rotor Blade and Method of Manufacturing Same" which is incorporated by reference herein in its entirety. Similarly, the main blade structure 15 may include the blade tip section 22 with one or more longitudinally extending spar caps 51, 53 infused therewith. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof.

In addition, as shown in FIGS. 4 and 7, the main blade structure 15 may include one or more shear webs 35 configured between the one or more spar caps 48, 50, 51, 53. More particularly, the shear web(s) 35 may be configured to increase the rigidity in the blade root section 20 and/or the blade tip section 22.

Referring to FIGS. 2-4, any number of outer blade segments 21 having any suitable size and/or shape may be generally arranged between the blade root section 20 and the blade tip section 22 along a longitudinal axis 27 in a generally span-wise direction. The blade segments 21 generally serve as the outer casing/covering of at least a portion of the rotor blade 16 (such as between the blade root section 20 and the blade tip section 22) and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. As mentioned, the blade segments 21 may be constructed of any suitable materials, including but not limited to a thermoset material or a thermoplastic material optionally reinforced with one or more fiber materials. More specifically, as generally shown in the figures, the blade segments 21 may include any one of or combination of the following blade segments: pressure side segments, suction side segments 46, leading edge segments 24 and/or trailing edge segments 26.

More specifically, as shown in FIG. 4, the leading edge segments 24 may have a forward pressure side surface 28 and a forward suction side surface 30. Similarly, each of the trailing edge segments 26 may have an aft pressure side surface 32 and an aft suction side surface 34. Thus, the forward pressure side surface 28 of the leading edge segment 24 and the aft pressure side surface 32 of the trailing edge segment 26 generally define a pressure side surface of the rotor blade 16. Similarly, the forward suction side surface 30 of the leading edge segment 24 and the aft suction side surface 34 of the trailing edge segment 26 generally define a suction side surface of the rotor blade 16.

As discussed, the various blade components of the rotor blade 16, such as the main blade structure 15 and/or the various blade segments 21, may include a thermoset resin and/or a thermoplastic resin. Thermoplastic resins as described herein generally encompass a plastic material or polymer that is reversible in nature. For example, thermoplastic resins typically become pliable or moldable when heated to a certain temperature and return to a more rigid, solidified state upon cooling. Further, thermoplastic resins may include amorphous thermoplastic resins and/or semi-crystalline thermoplastic resins. For example, some amorphous thermoplastic resins may generally include, but are not limited to styrenes, vinyls, cellulosics, polyesters, acrylics, polysulphones, and/or imides. More specifically, example amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, example semi-crystalline thermoplastic resins may generally include, but are not limited to, polyolefins, polyamides, fluropolymers, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. The thermoset resins as described herein generally encompass a plastic material or polymer that is non-reversible in nature. For example, thermoset resins, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset materials.

Referring briefly to FIG. 10, an embodiment of a composite 100 utilized in accordance with the present disclosure is provided. As illustrated, the composite 100 generally includes a resin 102 (which may be a thermoset or thermoplastic) and a plurality of fibers 104 embedded therein. In exemplary embodiments the fibers 104 are continuous, generally unidirectional fibers which extend along a longitudinal axis 108 as illustrated. Alternatively, discontinuous fibers may be utilized, and/or the fibers may extend at any suitable angles.

Referring now to FIGS. 4-9 and 11, the present disclosure is further directed to methods 300 for joining blade components of a rotor blade 16, and resulting rotor blades 16 having improved joints between the various blade components thereof. In general, a blade component may be any suitable component of the rotor blade 16, such as a component of the main blade structure 15, a blade segment 21, or another suitable component. As illustrated, a rotor blade 16 may include a first blade component 200 and a second blade component 210. At least one blade component, and in exemplary embodiments both blade components, may include and thus be formed at least partially from, a thermoplastic resin. (In alternative embodiments one blade component may include and thus be formed at least partially from a thermoset resin). In some embodiments, the resin may be a neat resin which is free from fibers. In other embodiments, the blade components may include fiber reinforced thermoplastic composites, which may include the thermoplastic resin and a plurality of fibers embedded in the thermoplastic resin as discussed herein.

Notably, the first and second blade components 200, 210 may in exemplary embodiments be formed from a plurality of layers, or plies. One or more of the plies may thus include the thermoplastic resin and/or composite as discussed.

In some embodiments, as illustrated in FIGS. 4-7 and 9, the entire first blade component 200 may include the thermoplastic resin (and, optionally, composite including the thermoplastic resin and fibers). Alternatively, as illustrated in FIG. 8, only one or more localized portions 202 of the first blade component 200 may include the thermoplastic resin (and, optionally, composite including the thermoplastic resin and fibers). For example, one or more localized portions 202 may include the thermoplastic resin, while the remainder of the first blade component 200 may include a thermoset resin (and, optionally, a composite which includes the thermoset resin and fibers embedded therein). In some embodiments, for example, a localized portion 202 may be one or more of the plies forming the blade component 200. At least one localized portion 202 may be a joint portion which is utilized to form a joint as discussed herein and thus is in contact with an insert as discussed herein when joined with other components to form the rotor blade 16.

Similarly, in some embodiments, as illustrated in FIGS. 4-7 and 9, the entire second blade component 210 may include the thermoplastic resin (and, optionally, composite including the thermoplastic resin and fibers). Alternatively, as illustrated in FIG. 8, only one or more localized portions 212 of the second blade component 210 may include the thermoplastic resin (and, optionally, composite including the thermoplastic resin and fibers). For example, one or more localized portions 212 may include the thermoplastic resin, while the remainder of the second blade component 210 may include a thermoset resin (and, optionally, a composite which includes the thermoset resin and fibers embedded therein). In some embodiments, for example, a localized portion 212 may be one or more of the plies forming the blade component 210. At least one localized portion 212 may be a joint portion which is utilized to form a joint as discussed herein and thus is in contact with an insert as discussed herein when joined with other components to form the rotor blade 16.

In accordance with embodiments of method 300, and as illustrated as step 310, an insert 220 may be positioned between the first blade component 200 and the second blade component 210, and may be in contact with the first and second blade components 200, 210. As illustrated, the insert 220 may be positioned such that opposing outer surfaces of the insert 220 are in contact with outer surfaces of the first and second blade components 200, 210 wherein a joint between the first and second blade components 200, 210 is desired. Insert 220 may include a thermoplastic resin. In some embodiments, the resin may be a neat resin which is free from fibers. In other embodiments, the insert may include a fiber reinforced thermoplastic composite, which may include the thermoplastic resin and a plurality of fibers embedded in the thermoplastic resin as discussed herein. Insert 220 may, for example, be a single ply, or may be formed from a plurality of plies.

Further, the insert 220 may include an energy absorptive pigment 222 which may be dispersed within the resin. In embodiments wherein the insert 220 is formed from multiple plies, the energy absorptive pigment 222 may be dispersed within the resin of at least one, or more than one, ply. The energy absorptive pigment 222 may, as discussed herein, advantageously facilitate improved joining of the blade components 200, 210 to form the rotor blade 16. In exemplary embodiments, the energy absorptive pigment 222 may be carbon black.

Notably, in exemplary embodiments, the first blade component 200 and the second blade component 210 are free from energy absorptive pigment.

Further, in exemplary embodiments, the thermoplastic resin of the insert 220 may be the same as the thermoplastic resin of the first blade component 200 and the second blade component 210. Alternatively, one or more of the components 200, 210 and insert 220 may be formed from different thermoplastic resins.

In accordance with embodiments of method 300, and as illustrated as step 320, the components 200, 210 and the insert 220, such as the thermoplastic resins thereof at the joining locations wherein the insert 220 contacts the components 200, 210, may be heated to join the first blade component 200 and second blade component 210 (and insert 220) together. The resins of the components 200, 210 and insert 220 may be heated to above the melting points of the resins in order to facilitate joining thereof. In exemplary embodiments, welding may be utilized to heat the components 200, 210 and insert 220 to form welded interfaces 224, 226 between the first blade component 200 and insert 220 and between the second blade component 210 and insert 220, respectively.

While any suitable welding technique and apparatus may be utilized for heating, in particular exemplary embodiments, laser welding may be utilized for heating. Laser welding utilizes a transmissive layer and an absorptive layer to generate heat to facilitate welding. A laser beam is emitted and passes through the transmissive layer and is absorbed by the absorptive layer, generating heat at the interface of the layers. The use of energy absorptive pigment 222 in the insert 220 may allow the insert 220 to serve as the absorptive layer for laser welding, while the components 200, 210 serve as transmissive layers. Accordingly, laser welding can be utilized to create welded interfaces 224, 226, such as laser welded interfaces 224, 226, between the first blade component 200 and insert 220 and between the second blade component 210 and insert 220, respectively. As illustrated in FIG. 9, laser beams 230 may be emitted and may pass through the components 200, 210 and be absorbed by the insert 220 to generate heat and cause melting, welding and resulting bonding at interfaces 224, 226.

By providing an insert 220 that includes energy absorptive pigment 222, laser welding can advantageously be utilized without requiring that either the first blade component 200 or second blade component 210 has an absorptive layer and thus must include energy absorptive pigment 222. Accordingly, relatively less energy absorptive pigment 222 may be utilized, and less time and effort may be utilized in providing the pigment 222 to the insert 220 rather than to an entire or specific portions of a component 200, 210.

Notably, suitable alternative welding techniques include resistive welding, hot gas welding, speed tip welding, extrusion welding, contact welding, hot plate welding, high frequency welding, induction welding, injection welding, ultrasonic welding, friction welding, or solvent welding.

Laser welding, and welding in general, provides numerous advantages for joining of blade components 200, 210 and rotor blade 16 formation in general. Such joining techniques are relatively fast and inexpensive, and are further relatively high strength, in particular when compared to known thermoset bonding techniques. The present inventors have discovered that welding provides significantly improved strength advantages in rotor blades 16 formed in accordance with the present disclosure.

In accordance with embodiments of method 300, and as illustrated as step 315, in exemplary embodiments a compressive force 232 may be applied to the first blade component 200 and the second blade component 210, as well as to the insert 220 therebetween. Such force 232 may be applied before, during and/or after heating of the components 200, 210 and insert 220 to facilitate bonding of the components 200, 210 and insert 220 at the interfaces 224, 226 thereof. Any suitable clamping mechanisms or other suitable apparatus for providing a compressive force 232 to the components 200, 210 and insert 220 may be utilized.

In accordance with embodiments of method 300, and as illustrated as step 325, first blade component 200, second blade component 210 and insert 220, such as the thermoplastic resins thereof which were heated, may be cooled after heating. Cooling allows the resins to re-solidify and the bonds between the components 200, 210 and insert 220 be completed at the interfaces 224, 226. In some embodiments, cooling is performed by simply allowing the components 200, 210 and insert 220 to rest in an ambient temperature environment. In other embodiments, suitable active cooling techniques utilizing cooled air or another suitable gas or liquid may be utilized. The combination of heating and cooling as discussed herein may advantageously join the first blade component 200, second blade component 210 and insert 220 together.

FIGS. 5-7 illustrate various particular applications of joining techniques in accordance with the present disclosure to particular components of a rotor blade 16. For example, referring to FIG. 5, in some embodiments, the first blade component 200 is a sparcap 48, 50 and the second blade component 210 is an outer blade segment 21. Referring to FIG. 6, in some embodiments, the first blade component 200 is a first outer blade segment 21 and the second blade component 210 is a second outer blade segment 21. Notably, in some exemplary embodiments as illustrated in FIGS. 5 and 6, lap joints may be utilized to facilitate the welded interfaces 224, 226 in accordance with the present disclosure. Referring to FIG. 7, in some embodiments, the first blade component 200 is a shear web 35 and the second blade component 210 is a sparcap 48, 50.

In other embodiments, the first blade component 200 may be a blade segment, and the second blade component may be a surface feature. A surface feature is generally a component added to a surface, such as an exterior surface, of the rotor blade 16 to modify flow characteristics, lift characteristics, etc. of the rotor blade 16. For example, a surface feature may be a vortex generator. Vortex generators may be utilized to reduce flow separation during operation of a rotor blade 16. In some embodiments, a vortex generator may be generally fin-like. Alternatively, a vortex generator may have any suitable shape.

Additionally or alternatively, a surface feature may be a noise reducer. Noise reducers may be utilized to reduce noise generated by the wind flow over and away from a rotor blade 16. In some embodiments, a noise reducer may include a plurality of serrations. Additionally or alternatively, a noise reducer may include a plurality of bristles, or have any other suitable shape and/or configuration.

Further, a surface feature may be a winglet. Winglets may be utilized to increase lift at the tip 72 of a rotor blade 16. Still further, a surface feature may be a root enhancer or other suitable chord extension apparatus. Root enhancers may be utilized to increase lift at the root 74 of a rotor blade 16.

It should be understood that the present disclosure is not limited to the above disclosed surface features. Rather, any suitable device or apparatus configured on an exterior surface of a rotor blade 16 is within the scope and spirit of the present disclosure. Further, it should be understood that the present disclosure is not limited to such embodiments, and rather that joining of any suitable blade components of a rotor blade 16 is within the scope and spirit of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for joining blade components of a wind turbine rotor blade, the method comprising:
    positioning an insert between and in contact with a first blade component and a second blade component, at least one of the first blade component or the second blade component comprising a thermoset and a localized portion of a thermoplastic resin, the insert comprising a thermoplastic resin and an energy absorptive pigment;
    applying a compressive force to the first blade component, the second blade component, and the insert;
    heating the thermoplastic resin of the at least one of the first blade component or the second blade component and the thermoplastic resin of the insert; and
    cooling the thermoplastic resin of the at least one of the first blade component or the second blade component and the thermoplastic resin of the insert,
    wherein the heating step and the cooling step join the first blade component, the second blade component and the insert together.

2. The method of claim 1, wherein the first blade component and the second blade component each comprise a thermoset and a localized portion of a thermoplastic resin.

3. The method of claim 1, wherein the localized portion of the thermoplastic resin of the at least one of the first blade component or the second blade component comprises a plurality of fibers embedded in the thermoplastic resin.

4. The method of claim 1, wherein the insert comprises a fiber reinforced thermoplastic composite, the composite comprising the thermoplastic resin, the energy absorptive pigment and a plurality of fibers embedded in the thermoplastic resin.

5. The method of claim 1, wherein the energy absorptive pigment is carbon black.

6. The method of claim 1, wherein the compressive force is applied to the first blade component, the second blade component, and the insert by a clamping mechanism.

7. The method of claim 1, wherein the first blade component and the second blade component are free from energy absorptive pigment.

8. The method of claim 1, wherein the heating step is performed by laser welding.

9. The method of claim 1, wherein the first blade component is a first outer blade segment and the second blade component is a second outer blade segment.

10. The method of claim 1, wherein the first blade component is a sparcap and the second blade component is an outer blade segment.

11. The method of claim 1, wherein the first blade component is a shear web and the second blade component is a sparcap.

12. A rotor blade for a wind turbine, the rotor blade comprising:
    a first blade component and a second blade component, at least one of the first blade component or the second blade component comprising a thermoset and a localized portion of a thermoplastic resin; and an insert between and in contact with the first blade component and the second blade component, the insert comprising a thermoplastic resin and an energy absorptive pigment, the first blade component, the second blade component and the insert joined together by a welded interface between the insert and the first blade component and a welded interface between the insert and the second blade component.

13. The rotor blade of claim 12, wherein the welded interfaces are laser welded interfaces.

14. The rotor blade of claim 12, wherein the localized portion of the thermoplastic resin of the at least one of the first blade component or the second blade component comprises a plurality of fibers embedded in the thermoplastic resin.

15. The rotor blade of claim 12, wherein the insert comprises a fiber reinforced thermoplastic composite, the composite comprising the thermoplastic resin, the energy absorptive pigment and a plurality of fibers embedded in the thermoplastic resin.

16. The rotor blade of claim 12, wherein the first blade component is a first outer blade segment and the second blade component is a second outer blade segment.

17. The rotor blade of claim 12, wherein the first blade component is a sparcap and the second blade component is an outer blade segment.

18. The rotor blade of claim 12, wherein the first blade component is a shear web and the second blade component is a sparcap.

* * * * *